United States Patent
Liu et al.

(10) Patent No.: US 9,986,513 B1
(45) Date of Patent: May 29, 2018

(54) DEVICE TO-DEVICE (D2D) TRANSMISSION POWER CONTROL

(71) Applicant: Sprint Communications Company L.P., Overland Park, KS (US)

(72) Inventors: Chunmei Liu, Great Falls, VA (US); Pratik Kothari, Sterling, VA (US); Krishna D. Sitaram, Chantilly, VA (US); Hemanth Balaji Pawar, Brambleton, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days. days.

(21) Appl. No.: 15/396,465

(22) Filed: Dec. 31, 2016

(51) Int. Cl.
*H04B 7/00* (2006.01)
*H04W 52/24* (2009.01)
*H04W 76/02* (2009.01)
*H04W 52/28* (2009.01)
*H04W 24/08* (2009.01)
*H04B 17/318* (2015.01)

(52) U.S. Cl.
CPC ........ *H04W 52/241* (2013.01); *H04B 17/318* (2015.01); *H04W 24/08* (2013.01); *H04W 52/243* (2013.01); *H04W 52/283* (2013.01); *H04W 76/023* (2013.01)

(58) Field of Classification Search
CPC . H04W 24/10; H04W 52/243; H04W 52/245; H04W 52/383; H04W 76/023; H04W 84/18; H04W 88/04
USPC .... 455/41.1, 41.2, 522, 69, 423, 67.11, 436, 455/63.1, 67.13, 515, 504; 370/248, 252, 370/328, 329
See application file for complete search history.

(56) References Cited

U.S. PATENT DOCUMENTS

| 8,107,883 B2 * | 1/2012 | Peng | H04W 72/02 455/63.1 |
| 8,359,038 B2 * | 1/2013 | Hakola | H04W 28/04 370/329 |
| 8,504,052 B2 * | 8/2013 | Hakola | H04W 24/10 455/452.1 |

(Continued)

FOREIGN PATENT DOCUMENTS

| CN | 104244392 | 12/2014 |
| CN | 104349437 | 2/2015 |

(Continued)

*Primary Examiner* — Tan H Trinh (57) ABSTRACT

A wireless access point dynamically controls Device-to-Device (D2D) transmission power. The wireless access point exchanges wireless communications with a plurality of User Equipment (UEs) comprising Device-to-Base Station (D2BS) UEs and D2D UEs, determines geographical locations for each of the D2BS UEs and the D2D UEs, and processes the geographical locations for each of the D2BS UEs and the D2D UEs with a neighbor distance threshold to identify which of the D2BS UEs neighbors the D2D UEs and which of the D2BS UEs do not neighbor the D2D UEs. The wireless access point monitors a Radio Frequency (RF) interference for the neighbor D2BS UEs and the non-neighbor D2BS UEs, determines that a difference between the RF interference of the neighbor UEs and the non-neighbor D2BS UEs is above an RF interference threshold, and transmits an instruction to the D2D UEs neighboring the neighbor D2BS UEs to decrease a transmission power amount.

18 Claims, 6 Drawing Sheets

(56) References Cited

U.S. PATENT DOCUMENTS

| | | | |
|---|---|---|---|
| 8,644,216 B2 | 2/2014 | Mang et al. | |
| 8,838,156 B2 | 9/2014 | Tine et al. | |
| 9,002,281 B2* | 4/2015 | Fwu | H04W 72/02 370/328 |
| 9,014,112 B2* | 4/2015 | Ganu | H04W 16/10 370/311 |
| 9,055,460 B1 | 6/2015 | Kim | |
| 9,072,060 B2 | 6/2015 | Hugl et al. | |
| 9,125,101 B2* | 9/2015 | Talwar | H04W 24/10 |
| 9,173,138 B2 | 10/2015 | Agiwal | |
| 9,185,599 B2 | 11/2015 | Nam | |
| 9,198,209 B2 | 11/2015 | Grayson et al. | |
| 9,319,931 B2* | 4/2016 | Lim | H04W 72/085 |
| 9,351,340 B2* | 5/2016 | Ribeiro | H04W 99/00 |
| 9,467,930 B2 | 10/2016 | Lim et al. | |
| 9,609,502 B2* | 3/2017 | Xiong | H04W 4/008 |
| 9,629,191 B2* | 4/2017 | Koo | H04W 76/023 |
| 9,655,039 B2* | 5/2017 | Krishnamoorthy | H04W 48/20 |
| 9,788,186 B2* | 10/2017 | Chatterjee | H04W 48/16 |
| 9,843,992 B2* | 12/2017 | Thangarasa | H04W 48/16 |
| 2002/0122396 A1 | 9/2002 | Terasawa | |
| 2009/0109932 A1 | 8/2009 | Maheshwari et al. | |
| 2009/0305712 A1 | 12/2009 | Franceschini et al. | |
| 2010/0135205 A1 | 6/2010 | Li et al. | |
| 2010/0261469 A1* | 10/2010 | Ribeiro | H04W 99/00 455/423 |
| 2010/0329244 A1 | 12/2010 | Buckley et al. | |
| 2011/0021240 A1* | 1/2011 | Hiltunen | H04J 11/0086 455/522 |
| 2012/0155282 A1 | 6/2012 | Dorenbosch | |
| 2013/0083779 A1* | 4/2013 | Ahn | H04W 72/04 370/336 |
| 2013/0091526 A1 | 4/2013 | Iyer et al. | |
| 2013/0182644 A1 | 7/2013 | Kim et al. | |
| 2013/0310103 A1* | 11/2013 | Madan | H04W 52/242 455/522 |
| 2015/0117309 A1* | 4/2015 | Gage | H04W 8/005 370/328 |
| 2015/0181504 A1 | 6/2015 | Tsai | |
| 2015/0257113 A1* | 9/2015 | Prytz | H04W 52/383 370/329 |
| 2015/0319724 A1* | 11/2015 | Chae | H04W 8/005 370/315 |
| 2015/0327180 A1* | 11/2015 | Ryu | H04L 1/00 370/329 |
| 2015/0373554 A1 | 12/2015 | Freda et al. | |
| 2015/0373651 A1* | 12/2015 | Ryu | H04W 52/245 455/522 |
| 2016/0057709 A1* | 2/2016 | Gao | H04W 52/243 455/452.2 |
| 2016/0165411 A1* | 6/2016 | Lee | H04W 4/08 455/426.1 |
| 2016/0212668 A1 | 7/2016 | Castro Castro et al. | |
| 2016/0249297 A1* | 8/2016 | Oh | H04W 52/383 |
| 2016/0286561 A1* | 9/2016 | Huang | H04L 1/00 |
| 2016/0330699 A1* | 11/2016 | Yang | H04W 52/241 |
| 2017/0142692 A1* | 5/2017 | Kim | H04W 72/042 |
| 2017/0196013 A1* | 7/2017 | Shin | H04W 16/14 |
| 2017/0230915 A1* | 8/2017 | Kim | H04W 52/34 |
| 2017/0230919 A1* | 8/2017 | Siomina | H04W 52/383 |
| 2017/0238260 A1* | 8/2017 | Kim | H04W 52/04 455/522 |
| 2017/0250845 A1* | 8/2017 | Suzuki | H04L 27/2607 |
| 2017/0273077 A1* | 9/2017 | Kim | H04W 72/0446 |

FOREIGN PATENT DOCUMENTS

| | | |
|---|---|---|
| EP | 2770786 | 8/2014 |
| WO | 2014011008 | 1/2014 |

* cited by examiner

DEVICE TO-DEVICE (D2D) TRANSMISSION POWER CONTROL

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

Some wireless communication systems use Long Term Evolution (LTE) to exchange wireless data. LTE communication systems may be used to provide wireless signaling to the various wireless communication devices. Wireless access points, such as evolved NodeBs (eNodeBs), perform wireless networking tasks like device handovers, radio interference, management, and multipoint coordination. To facilitate these wireless networking tasks, the eNodeBs communicate over signaling links.

Wireless communication systems also offer a Device-to-Device (D2D) communication service. The D2D communication service enables User Equipment (UE) to perform direct wireless transmission and reception without user data traversal through an eNodeB. For the D2D service, the eNodeB allocates resources for one D2D UE and schedules the other D2D UEs to transmit over the same allocated resources. Therefore, the D2D UE transmits directly to other D2D UEs over the same resource blocks.

Although, D2D services allow UEs to access wireless communication systems without relaying user data between the wireless access point and the other D2D UEs, D2D services typically use higher transmission power levels which may result in interference issues when Device-to-Base Station (D2BS) UEs are exchanging data and signaling near the D2D UEs. Unfortunately, current methods of dynamically controlling D2D transmission power for D2D UEs causing interference to D2BS UEs are neither efficient nor effective.

TECHNICAL OVERVIEW

An wireless access point dynamically controls Device-to-Device (D2D) transmission power. The wireless access point wirelessly exchanges wireless communications with a plurality of User Equipment (UEs) comprising Device-to-Base Station (D2BS) UEs and D2D UEs. The wireless access point determines geographical locations for each of the D2BS UEs and the D2D UEs and processes the geographical locations for each of the D2BS UEs and the D2D UEs with a neighbor distance threshold to identify which of the D2BS UEs neighbors the D2D UEs and which of the D2BS UEs do not neighbor the D2D UEs. The wireless access point monitors a Radio Frequency (RF) interference for each of the neighbor D2BS UEs and the non-neighbor D2BS UEs and determines that a difference between the RF interference for each of the neighbor UEs and the non-neighbor D2BS UEs is above an RF interference threshold. The wireless access point wirelessly transmits an instruction to the D2D UEs neighboring the neighbor D2BS UEs to decrease a transmission power amount.

DETAILED DESCRIPTION

Figure 1:
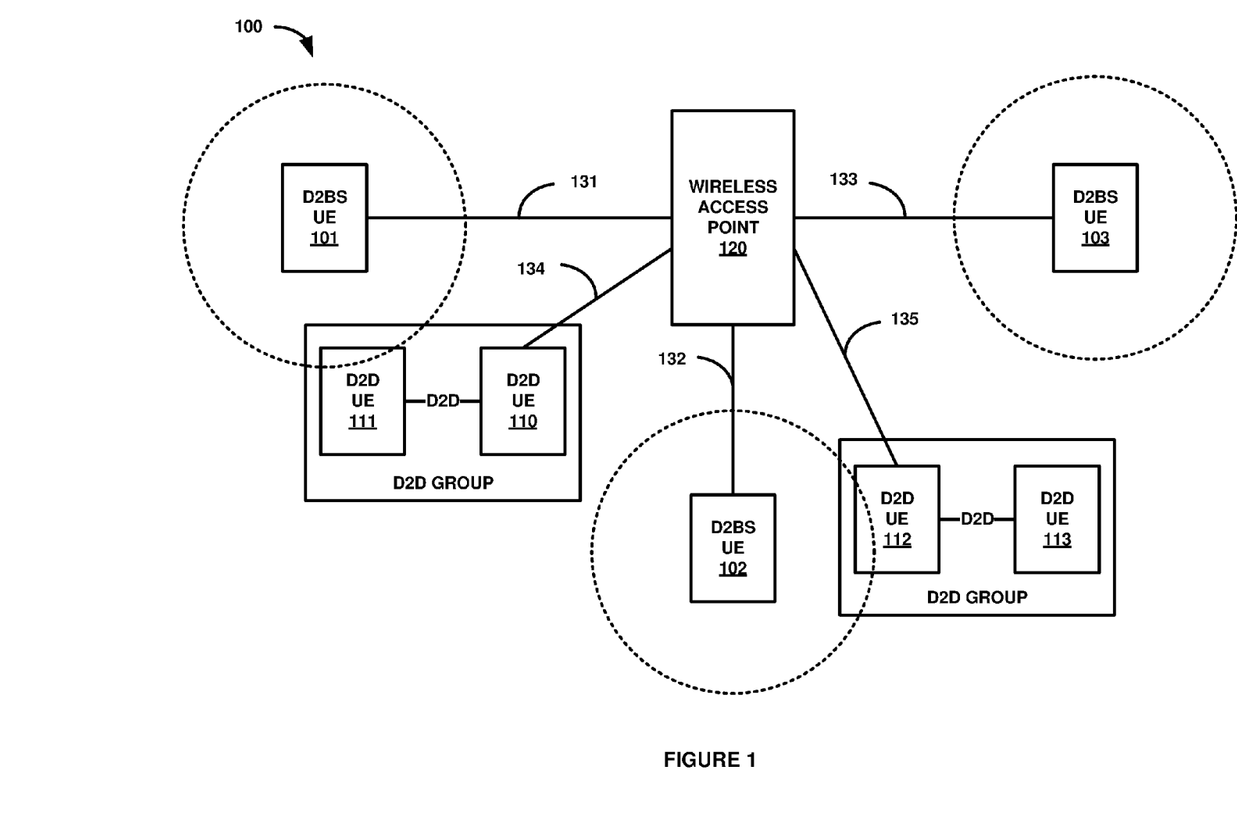
FIGS. 1-3 illustrates a wireless communication network to dynamically control Device-to-Device (D2D) transmission power.
Figure 2:
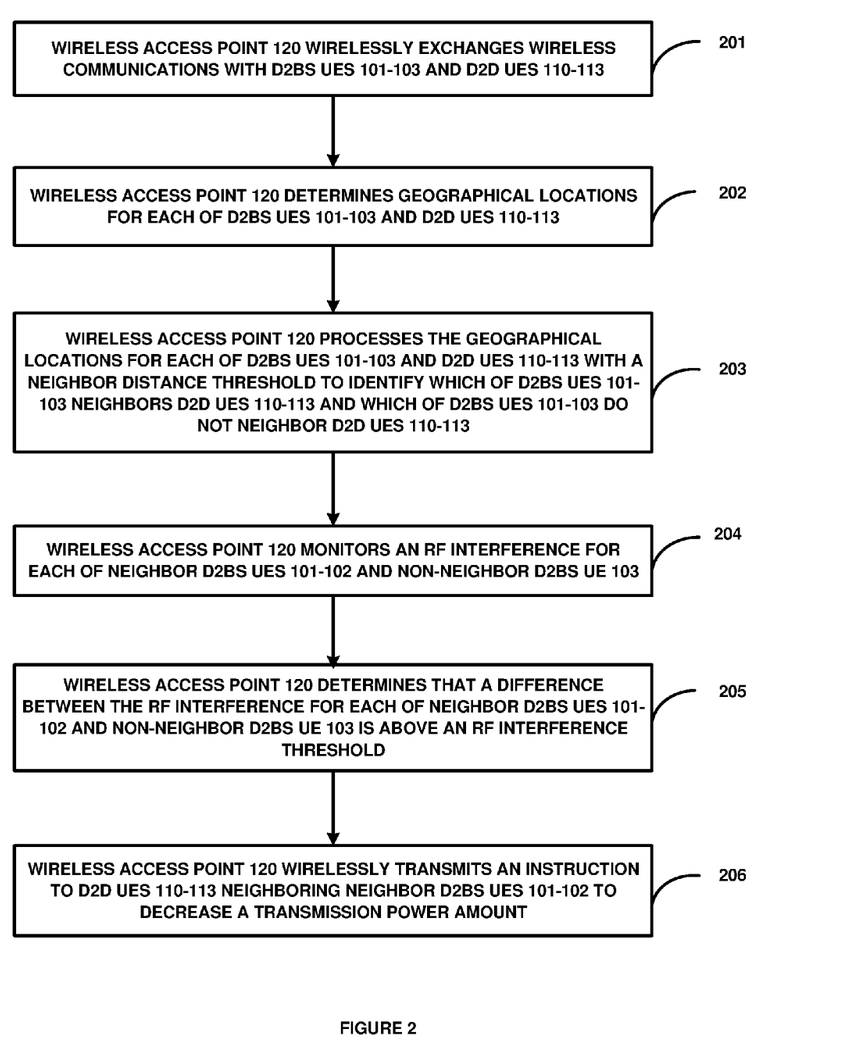
Figure 3:
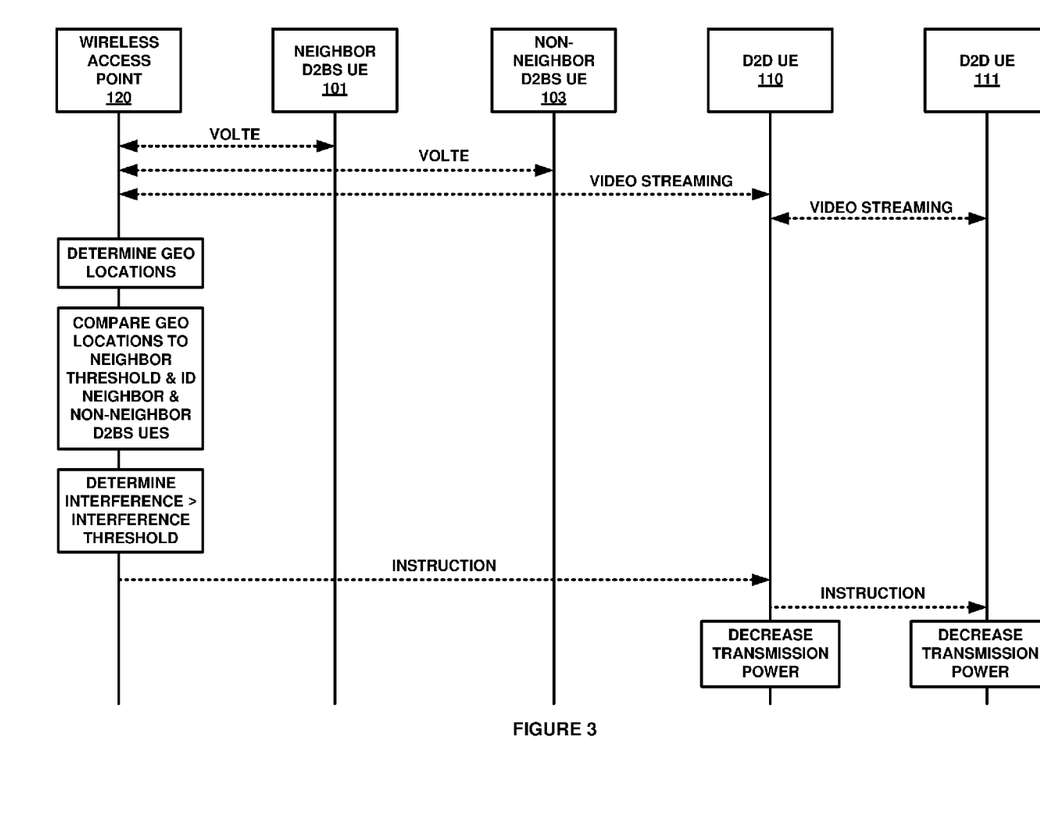

FIGS. 1-3 illustrate wireless communication system 100 to dynamically control Device-to-Device (D2D) transmission power. Referring to FIG. 1, wireless communication system 100 comprises Device-to-Base Station (D2BS) User Equipment (UEs) 101-103, D2D UEs 110-113, and wireless access point 120. D2BS UEs 101-103 communicate with wireless access point 120 over wireless links 131-133. D2D UEs 110-113 communicate with wireless access point 120 over wireless links 134-135. D2D UEs 110-113 are each included in a D2D group and communicate with the other D2D UE in the D2D group over D2D links. It should also be noted that D2BS UEs 101-103 each include a neighbor distance threshold as indicated by the dotted line circles.

D2BS UEs 101-103 and D2D UEs 110-113 could each be a phone, tablet computer, media device, an intelligent machine, or some other apparatus having a wireless transceiver. D2BS UEs 101-103 include processing circuitry and memory that store and execute various software modules. D2BS UEs 101-103 may wirelessly receive and transmit Radio Frequency (RF) signaling to attach, request services, and exchange data with wireless access point 120. D2D UEs 110-113 may be configured to provide wireless coverage to one or more UEs for voice calls, media streaming, internet access, text messages, and the like.

Wireless access point 120 may comprise a macro base station, picocell base station, femtocell base station, a wireless hotspot, an evolved NodeB (eNodeB), or some other wireless access point that may provide wireless communication services to D2BS UEs 101-103 and D2D UEs 110-113. Wireless access point 120 includes communication transceivers comprising antennas, amplifiers, modulators, filers, and digital signal processors. Wireless access point 120 also includes data processing circuitry, memory, and operating software to control the transceivers and server network applications. Wireless access point 120 uses RF signaling to perform UE attachment, schedule services, and exchange data with D2BS UEs 101-103 and D2D UEs 110-113. Wireless access point 120 is also configured to determine geographical locations of D2BS UEs 101-103 and D2D UEs 110-113. Wireless access point 120 is also configured to transmit instructions to D2D UEs 110-113 to modify transmission power amounts.

Wireless communication links 130-135 use air or space as the transport media. Wireless communication links 130-135 may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), Evolution Data Only (EVDO), Worldwide Interoperability for Microwave Access (WIMAX), Global System for Mobile Communication (GSM), High Speed Packet Access (HSPA), or some other wireless communication format—including combinations thereof.

In operation, wireless access point 120 wirelessly exchanges wireless communications with D2BS UEs 101-103 and D2D UEs 110-113. Wireless access point 120 may exchange wireless communications with D2Bs UEs 101-103 and D2D UEs 110-113 by receiving attachment and registration data from D2BS UEs 101-103 and D2D UEs 110-113 and responsively establishing signaling and data bearers with D2BS UEs 101-103, D2D UE 110, and D2D UE 112. It should be noted that wireless access point 120 exchanges signaling and data with D2D UE 111 over D2D UE 110, and with D2D UE 113 over D2D UE 112. Wireless access point 120 may then track which UEs are performing D2D services to other D2D UEs within a D2D group.

Wireless access point 120 determines geographical locations for each of D2BS UEs 101-103 and D2D UEs 110-113. Wireless access point 120 may determine the geographical locations for each of D2BS UEs 101-103 and D2D UEs 110-113 using location based services, Global Positioning Systems (GPS), cell triangulation, or some other mobile location tracking technique.

In a next operation, wireless access point 120 processes the geographical locations for each of D2BS UEs 101-103 and D2D UEs 110-113 with a neighbor distance threshold to identify which of D2BS UEs 101-103 neighbors D2D UEs 110-113 and which of D2BS UEs 101-103 do not neighbor D2D UEs 110-113. The neighbor distance threshold may comprise a physical distance range from one of D2D UEs 110-113 to D2BS UEs 101-103, such as D2BS UE 101 geographically located within 50 meters of one of D2D UEs 110-113. The neighbor distance threshold may also comprise an average distance from a D2D group of D2D UEs 110-113 to D2BS UEs 101-103, such as D2BS UE 102 within 50 meters of D2D UE 110 and within 100 meters of D2D UE 111 for an average of 75 meters from the D2D group.

Wireless access point 120 monitors an RF interference for each of neighbor D2BS UEs 101-102 and non-neighbor D2BS UE 103. In some examples, the RF interference for each of neighbor D2BS UEs 101-102 and non-neighbor D2BS UE 103 comprises a Signal-to-Noise Ratio (SINR) measurement received from each of neighbor D2BS UEs 101-102 and non-neighbor D2BS UE 103. In other examples, the RF interference for each of neighbor D2BS UEs 101-102 and non-neighbor D2BS UE 103 comprises a packet loss rate reported by each of neighbor D2BS UEs 101-102 and non-neighbor D2BS UE 103.

In some examples, the RF interference for each of neighbor D2BS UEs 101-102 and non-neighbor D2BS UE 103 comprises a Reference Signal Received Power (RSRP) measurement reported by each of neighbor D2BS UEs 101-102 and non-neighbor D2BS UE 103. In other examples, the RF interference for each of neighbor D2BS UEs 101-102 and non-neighbor D2BS UE 103 comprises a Reference Signal Received Quality (RSRQ) measurement reported by each of neighbor D2BS UEs 101-102 and non-neighbor D2BS UE 103.

Wireless access point 120 determines that a difference between the RF interference for each of neighbor D2BS UEs 101-102 and non-neighbor D2BS UE 103 is above an RF interference threshold. The difference between the RF interference for each of the neighbor D2BS UEs 101-102 and non-neighbor D2BS UE 103 may be determined by calculating an average RF interference for all of D2BS UEs 101-103 and comparing the RF interference for each of neighboring D2BS UEs 101-102 and non-neighbor D2BS UE 103 to the average RF interference to determine if the RF interference difference between the average RF interference and the RF interference for each of neighbor D2BS UEs 101-102 and non-neighbor D2BS UE 103 is above an RF interference difference threshold.

The difference between the RF interference for each of the neighbor D2BS UEs 101-102 and non-neighbor D2BS UE 103 may also be determined by determining a subset of the non-neighboring D2BS UEs that have an RF interference within a threshold range of the neighboring D2BS UEs RF interference and calculating an average RF interference for neighboring D2BS UEs 101-102 and the subset of non-neighboring D2BS UEs. In this example, wireless access point 120 then compares the RF interference for each of neighboring D2BS UEs 101-102 and the subset of non-neighbor D2BS UEs to the average RF interference to determine if the RF interference difference between the average RF interference and the RF interference for each of neighbor D2BS UEs 101-102 and the subset of non-neighbor D2BS UEs is above an RF interference difference threshold.

The RF interference threshold may be pre-determined and stored within wireless access point 120. The RF interference threshold may also be received from an external wireless network element, such as a Mobility Management Entity (MME), a Home Subscriber Subsystem (HSS), a Policy and Charging Rules Function (PCRF), or some other wireless network control element. The RF interference may be stored in a database or determined dynamically by wireless network control elements or wireless access point 120.

In a final operation, wireless access point 120 wirelessly transmits an instruction to D2D UEs 110-113 neighboring neighbor D2BS UEs 101-102 to decrease a transmission power amount. Wireless access point 120 may wirelessly transmit the instruction to D2D UEs 110-113 in a message indicating an interval amount for D2D UEs 110-113 to decrease the transmission power amount.

FIG. 2 is a flow diagram illustrating an operation of wireless communication system 100 to dynamically control D2D transmission power. In operation, wireless access point 120 wirelessly exchanges (201) wireless communications with D2BS UEs 101-103 and D2D UEs 110-113. Wireless access point 120 determines (202) geographical locations for each of D2BS UEs 101-103 and D2D UEs 110-113. Wireless access point 120 processes (203) the geographical locations for each of D2BS UEs 101-103 and D2D UEs 110-113 with a neighbor distance threshold to identify which of D2BS UEs 101-103 neighbors D2D UEs 110-113 and which of D2BS UEs 101-103 do not neighbor D2D UEs 110-113.

Wireless access point 120 monitors (204) an RF interference for each of neighbor D2BS UEs 101-102 and non-neighbor D2BS UE 103. Wireless access point 120 determines (205) that a difference between the RF interference for each of neighbor D2BS UEs 101-102 and non-neighbor D2BS UE 103 is above an RF interference threshold. Wireless access point 120 wirelessly transmits (206) an instruction to D2D UEs 110-113 neighboring neighbor D2BS UEs 101-102 to decrease a transmission power amount.

FIG. 3 illustrates a sequence diagram of wireless communication system 100 to control D2D scheduling. In operation, wireless access point 120 wirelessly exchanges wireless communications with D2BS UEs 101-103 and D2D UEs 110-113. For example, wireless access point 120 may exchange Voice over LTE (VoLTE) with D2BS UEs 101-103 and video streaming data with D2D UEs 110-113. In this example, D2D UE 110 and D2D UE 112 exchange video streaming data with D2D UE 111 and D2D UE 113, respectively.

Wireless access point 120 determines geographical locations for each of D2BS UEs 101-103 and D2D UEs 110-113 and processes the geographical locations for each of D2BS UEs 101-103 and D2D UEs 110-113 with a neighbor distance threshold to identify which of D2BS UEs 101-103 neighbors D2D UEs 110-113 and which of D2BS UEs 101-103 do not neighbor D2D UEs 110-113. For example, the radial neighbor distance around D2BS UE 101 overlaps with D2D UE 111 and the radial neighbor distance around D2BS UE 102 overlaps with D2D UE 112. However, the radial neighbor distance around D2BS UE 103 does not overlap with any of D2D UEs 110-113. Therefore, wireless access point 120 may determine that D2BS UEs 101-102 are neighbor D2BS UEs and that D2BS UE 103 is a non-neighbor D2BS UE.

Wireless access point 120 monitors an RF interference for each of neighbor D2BS UEs 101-102 and non-neighbor D2BS UE 103. For example, wireless access point 120 may receive RF measurement reports from each of D2BS UEs 101-103 indicating SINR measurements. Wireless access point 120 then determines that a difference between the SINR measurements for each of neighbor D2BS UEs 101-102 and non-neighbor D2BS UE 103 is above an SINR measurement threshold.

For example, wireless access point 120 may identify a subset of the non-neighbor D2BS UEs, such as non-neighbor UE 103, based on non-neighbor D2BS UE 103 containing a SINR measurement within a SINR measurement threshold range of neighbor D2BS UEs 101-102. In this example, wireless access point 120 then determines that the difference between the SINR measurement for each of neighbor D2BS UEs 101-102 and non-neighbor D2BS UE 103 is above the SINR measurement threshold.

Wireless access point 120 then wirelessly transmits an instruction to D2D UEs 110-113 neighboring neighbor D2BS UEs 101-102 to decrease a transmission power amount. For example, D2D UE 110 and D2D UE 112 each receive the instructions from wireless access point 120 to decrease the transmission power. D2D UE 110 and D2D UE 112 then process the instruction and transfer the instruction to the other D2D UEs in the D2D group, such as D2D UE 111 and D2D UE 113. D2D UEs 110-113 then decrease from a transmission power amount to a lower transmission power amount for subsequent communications.

In some examples, in response to wirelessly transmitting the instruction to D2D UEs 110-113 neighboring neighbor D2BS UEs 101-102 to decrease the transmission power amount, wireless access point 120 monitors the RF interference for each of neighbor D2BS UEs 101-102 and non-neighbor D2BS UE 103 and determines that a new difference between the RF interference for each of neighbor D2BS UEs 101-102 and non-neighbor D2BS UE 103 is above the RF interference threshold. In this example, wireless access point 120 then wirelessly transmits an additional instruction to D2D UEs 110-113 neighboring neighbor D2BS UEs 101-102 to decrease the transmission power amount.

In other examples, in response to wirelessly transmitting the instruction to D2D UEs 110-113 neighboring neighbor D2BS UEs 101-102 to decrease the transmission power amount, wireless access point again monitors the RF interference for each of neighbor D2BS UEs 101-102 and non-neighbor D2BS UE 103 and determines that a new difference between the RF interference for each of neighbor D2BS UEs 101-102 and non-neighbor D2BS UE 103 is below the RF interference threshold. In this example, wireless access point then wirelessly transmits an additional instruction to D2D UEs 110-113 neighboring neighbor D2BS UEs 101-102 to increase the transmission power amount.

In some examples, in response to wirelessly transmitting the instruction to D2D UEs 110-113 neighboring neighbor D2BS UEs 101-102 to decrease the transmission power amount, wireless access point 120 monitors the RF interference for each of neighbor D2BS UEs 101-102 and non-neighbor D2BS UE 103 and determines that a new difference between the RF interference for each of neighbor D2BS UEs 101-102 and non-neighbor D2BS UE 103 is equal to or greater than the original difference between the RF interference for each of neighbor D2BS UEs 101-102 and non-neighbor D2BS UE 103. In this example, wireless access point 120 then wirelessly transmits an additional instruction to D2D UEs 110-113 neighboring neighbor D2BS UEs 101-102 to increase the transmission power amount.

Figure 4:
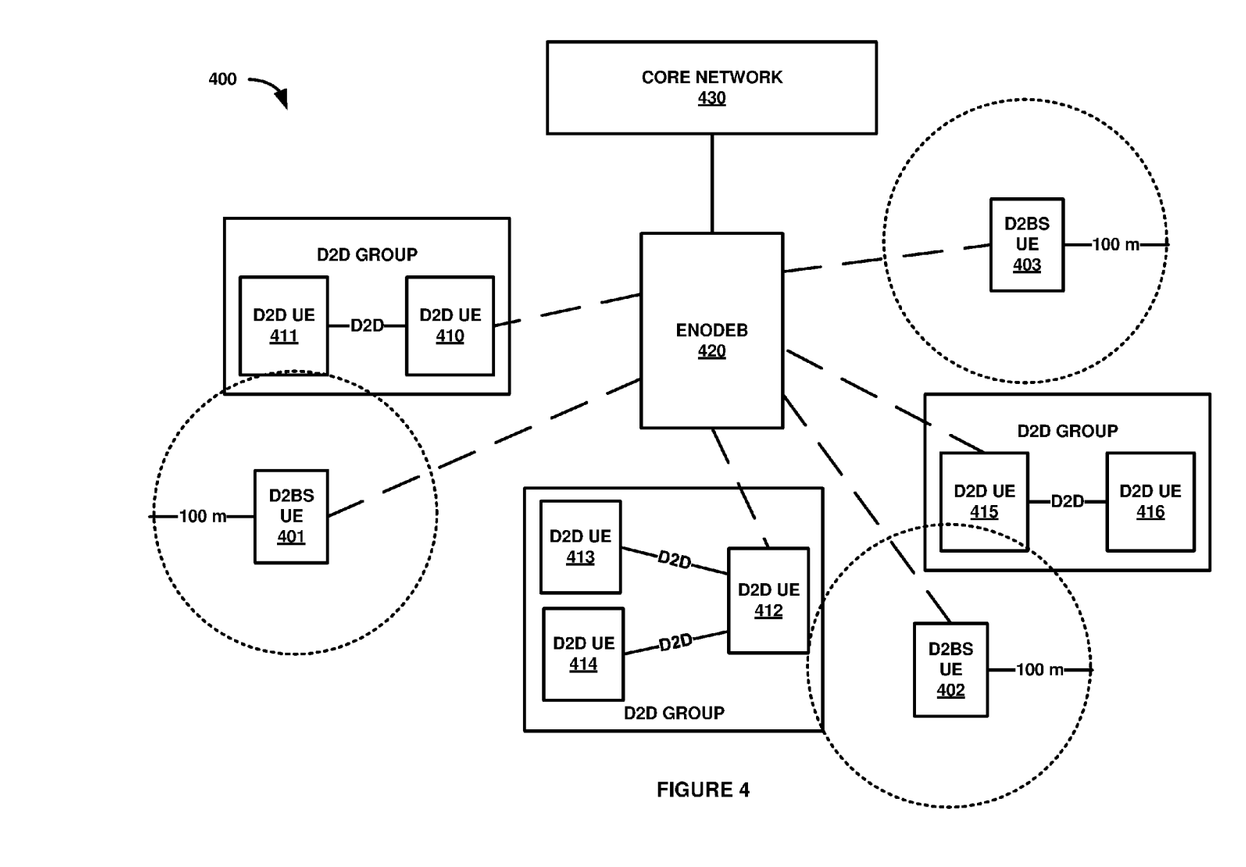
FIGS. 4-5 illustrate a Long Term Evolution (LTE) communication system to dynamically control D2D transmission power.

FIG. 4 illustrates LTE communication system 400 to dynamically control D2D transmission power. LTE communication system 400 is an example of wireless communication system 100, although wireless communication system 100 may use alternative configurations and operations. LTE communication system 400 comprises UEs 401-404, D2D UEs 410-416, LTE eNodeB 420, and LTE core network 430.

As indicated by the dotted line circles, D2BS UEs 401-403 each have a radial neighbor distance threshold of 100 meters. As indicated by the dashed lines, D2BS UE 401, D2BS UE 403, D2D UE 410, D2D UE 412, and D2D UE 415 are each exchanging data and signaling with LTE eNodeB 420. It should also be noted that D2D UE 411, D2D 413, D2D UE 414, and D2D UE 416 are each receiving data and signaling over D2D links.

Figure 5:
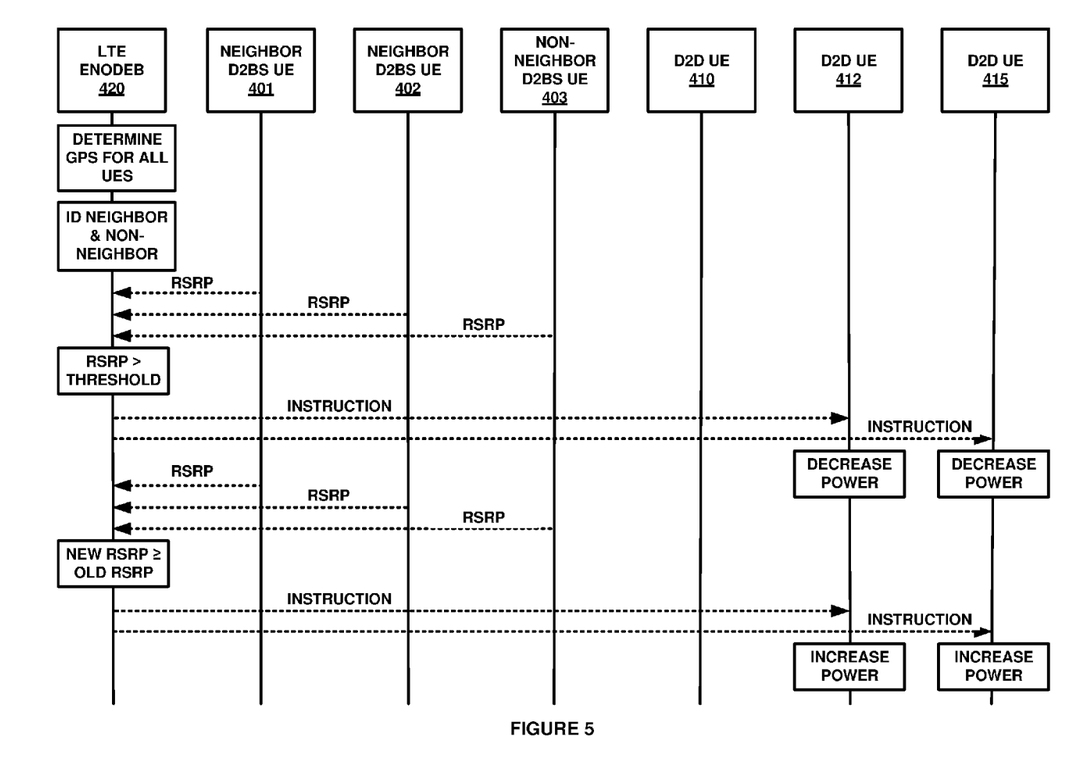

FIG. 5 illustrates an operation of LTE communication system 400 to dynamically control D2D transmission power. In operation, LTE eNodeB 420 wirelessly exchanges wireless communications with D2BS UEs 401-403 and D2D UEs 410-416. LTE eNodeB 420 also determines GPS locations for each of D2BS UEs 401-403 and D2D UEs 410-416 and processes the GPS locations for each of D2BS UEs 401-403 and D2D UEs 410-416 with a radial neighbor distance threshold of 100 meters to identify which of D2BS UEs 401-403 neighbors D2D UEs 410-416 and which of D2BS UEs 401-403 do not neighbor D2D UEs 410-416.

LTE eNodeB 420 monitors RSRP measurements for each of neighbor D2BS UEs 401-402 and non-neighbor D2BS UE 403. LTE eNodeB 420 determines if a difference between the RSRP measurements for each of neighbor D2BS UEs 401-402 and non-neighbor D2BS UE 403 are above an RSRP measurement threshold. In this example embodiment, the difference between the RSRP measurement for neighbor D2BS UE 401 and non-neighbor D2BS UE 403 are below the RSRP measurement threshold. However, the difference between the RSRP measurement for neighbor D2BS UE 402 is above the RSRP measurement threshold. Therefore, LTE eNodeB 420 wirelessly transmits an instruction to D2D UE 412 and D2D UE 415 neighboring neighbor D2BS UE 402 to decrease a transmission power amount. It should be noted that LTE eNodeB 420 does not wirelessly transmits an instruction to D2D UE 410 neighboring neighbor D2BS UE 401 to decrease a transmission power amount because the difference between the RSRP measurement for neighbor D2BS UE 401 is below the RSRP measurement threshold.

In response to wirelessly transmitting the instruction to D2D UE 412 and D2D UE 415 to decrease the transmission power amount, LTE eNodeB 420 again monitors the RSRP measurements for each of neighbor D2BS UEs 401-402 and non-neighbor D2BS UE 403. In this example embodiment, LTE eNodeB 420 then determines that a new difference between the RSRP measurement for neighbor D2BS UE 401 and non-neighbor D2BS UE 403 are again below the RSRP measurement threshold. However, a new difference between the RSRP measurement for neighbor D2BS UE 402 is again above the RSRP measurement threshold, and is equal to or greater than the original difference of the RSRP measurement for neighbor D2BS UE 402. LTE eNodeB 420 determines that the high interference may be caused by other factors and not D2D UEs 412-416. Therefore, LTE eNodeB 420 wirelessly transmits an additional instruction to D2D UE 412 and D2D UE 415 neighboring neighbor D2BS UE 402 to increase the transmission power amount.

Figure 6:
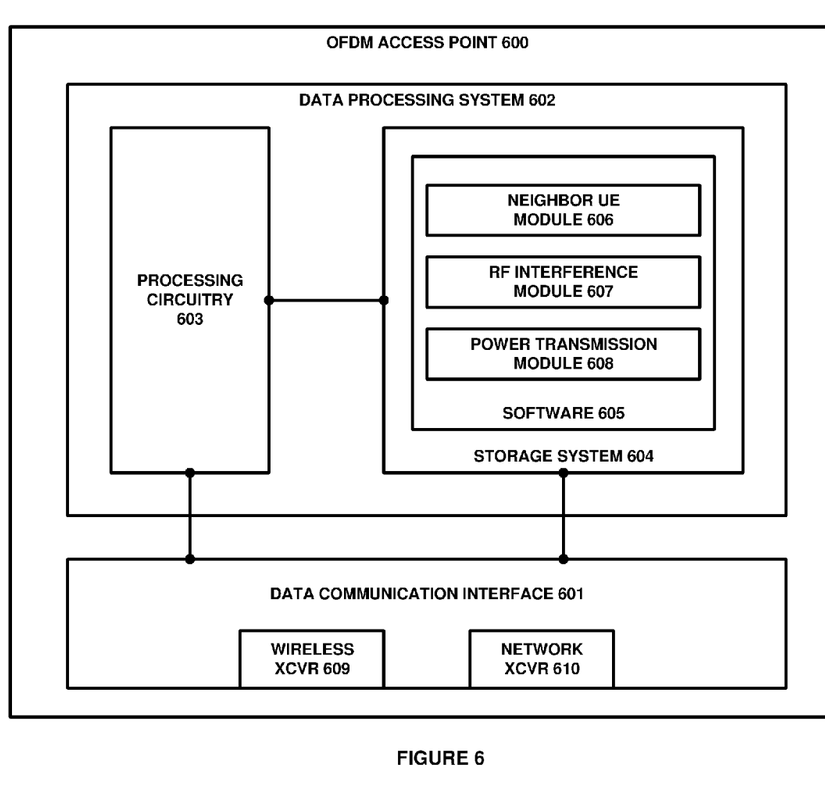
FIG. 6 illustrates a wireless access point to dynamically control D2D transmission power.

FIG. 6 illustrates wireless access point 600 to dynamically control D2D transmission power. Wireless access point 600 is an example of wireless access point 120 and eNodeB 420, although wireless access point 120 and eNodeB 420 may use alternative configurations and operations. Wireless access point 600 comprises data communication interface 601 and data processing system 602. Data communication interface 601 comprises wireless transceiver 609 and network transceiver 610. Data processing system 602 comprises processing circuitry 603 and storage system 604. Storage system 604 stores software 605. Software 605 includes respective software modules 606-609.

Wireless transceiver 609 comprises wireless communication components, such as antennas, amplifiers, filters, modulators, digital signal processors, bus interfaces, memory, software, and the like. Network transceiver 610 may comprise wireless and/or wireline communication components, such as ports, bus interfaces, digital signal processors, antennas, amplifiers, filters, modulators, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, data servers, and the like. Software 605 comprises machine-readable instructions that control the operation of processing circuitry 603 when executed. Wireless access point 600 may be centralized or distributed. All or portions of software modules 606-608 may be externally stored on one or more storage media, such as circuitry, discs, and the like. Some conventional aspects of wireless access point 600 are omitted for clarity, such as power supplies, enclosures, and the like.

When executed by processing circuitry 603, neighbor D2BS UE module 606 directs circuitry 603 to determine geographical locations for each of the D2BS UEs and the D2D UEs. When executed by processing circuitry 603, neighbor D2BS UE module 606 also directs circuitry 603 to process the geographical locations for each of the D2BS UEs and the D2D UEs with a neighbor distance threshold to identify which of the D2BS UEs neighbors the D2D UEs and which of the D2BS UEs do not neighbor the D2D UEs.

When executed by processing circuitry 603, RF interference module 607 directs circuitry 603 to monitor an RF interference for each of the neighbor D2BS UEs and the non-neighbor D2BS UEs. When executed by processing circuitry 603, RF interference module 607 also directs circuitry to determine that a difference between the RF interference for each of the neighbor UEs and the non-neighbor D2BS UEs is above an RF interference threshold. When executed by processing circuitry 603, power transmission module 608 directs circuitry 603 to wirelessly transmit an instruction to the D2D UEs neighboring the neighbor D2BS UEs to decrease a transmission power amount.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless access point to dynamically control Device-to-Device (D2D) transmission power, the method comprising:
   wirelessly exchanging wireless communications with a plurality of User Equipment (UEs) comprising Device-to-Base Station (D2BS) UEs and D2D UEs;
   determining geographical locations for each of the D2BS UEs and the D2D UEs and processing the geographical locations for each of the D2BS UEs and the D2D UEs with a neighbor distance threshold to identify which of the D2BS UEs neighbors the D2D UEs and which of the D2BS UEs do not neighbor the D2D UEs;
   monitoring a Radio Frequency (RF) interference for each of the neighbor D2BS UEs and the non-neighbor D2BS UEs, identifying a subset of the non-neighbor D2BS UEs having the RF interference within a threshold range of the neighbor D2BS UEs, and determining that a difference between the RF interference for each of the neighbor D2BS UEs and the subset of the non-neighbor D2BS UEs is above an RF interference threshold; and
   wirelessly transmitting an instruction to the D2D UEs neighboring the neighbor D2BS UEs to decrease a transmission power amount.

2. The method of claim 1 further comprising:
   in response to wirelessly transmitting the instruction to the D2D UEs neighboring the neighbor D2BS UEs to decrease the transmission power amount, monitoring the RF interference for each of the neighbor D2BS UEs and the subset of the non-neighbor D2BS UEs and determining that a new difference between the RF interference for each of the neighbor D2BS UEs and the subset of the non-neighbor D2BS UEs is above the RF interference threshold; and wirelessly transmitting an additional instruction to the D2D UEs neighboring the neighbor D2BS UEs to decrease the transmission power amount.

3. The method of claim 1 further comprising:
   in response to wirelessly transmitting the instruction to the D2D UEs neighboring the neighbor D2BS UEs to decrease the transmission power amount, monitoring the RF interference for each of the neighbor D2BS UEs and the subset of the non-neighbor D2BS UEs and determining that a new difference between the RF interference for each of the neighbor D2BS UEs and the subset of the non-neighbor D2BS UEs is below the RF interference threshold; and wirelessly transmitting an additional instruction to the D2D UEs neighboring the neighbor D2BS UEs to increase the transmission power amount.

4. The method of claim 1 further comprising:
   in response to wirelessly transmitting the instruction to the D2D UEs neighboring the neighbor D2BS UEs to decrease the transmission power amount, monitoring the RF interference for each of the neighbor D2BS UEs and the subset of the non-neighbor D2BS UEs and determining that a new difference between the RF interference for each of the neighbor D2BS UEs and the subset of the non-neighbor D2BS UEs is equal to or greater than the original difference between the RF interference for each of the neighbor D2BS UEs and the subset of the non-neighbor D2BS UEs; and wirelessly transmitting an additional instruction to the D2D UEs neighboring the neighbor D2BS UEs to increase the transmission power amount.

5. The method of claim 1 wherein the RF interference for each of the neighbor D2BS UEs and the non-neighbor D2BS UEs comprises a Signal-to-Noise Ratio (SNR) for each of the neighbor D2BS UEs and the non-neighbor D2BS UEs.

6. The method of claim 1 wherein the RF interference for each of the neighbor D2BS UEs and the non-neighbor D2BS UEs comprises a Reference Signal Received Power (RSRP) for each of the neighbor D2BS UEs and the non-neighbor D2BS UEs.

7. The method of claim 1 wherein the RF interference for each of the neighbor D2BS UEs and the non-neighbor D2BS UEs comprises a Reference Signal Received Quality (RSRQ) for each of the neighbor D2BS UEs and the non-neighbor D2BS UEs.

8. The method of claim 1 wherein the RF interference for each of the neighbor D2BS UEs and the non-neighbor D2BS UEs comprises a packet loss rate for each of the neighbor D2BS UEs and the non-neighbor D2BS UEs.

9. The method of claim 1 wherein the wireless access point comprises a Long Term Evolution (LTE) evolved NodeB (eNodeB).

10. A wireless access point to dynamically control Device-to-Device (D2D) transmission power, the wireless access point comprising:
a communication interface configured to wirelessly exchange wireless communications with a plurality of User Equipment (UEs) comprising Device-to-Base Station (D2BS) UEs and D2D UEs;
a processing system configured to determine geographical locations for each of the D2BS UEs and the D2D UEs and process the geographical locations for each of the D2BS UEs and the D2D UEs with a neighbor distance threshold to identify which of the D2BS UEs neighbors the D2D UEs and which of the D2BS UEs do not neighbor the D2D UEs;
the processing system configured to monitor a Radio Frequency (RF) interference for each of the neighbor D2BS UEs and the non-neighbor D2BS UEs, identify a subset of the non-neighbor D2BS UEs having the RF interference within a threshold range of the neighbor D2BS UEs, and determine that a difference between the RF interference for each of the neighbor UEs and the subset of the non-neighbor D2BS UEs is above an RF interference threshold; and
the communication interface configured to wirelessly transmit an instruction to the D2D UEs neighboring the neighbor D2BS UEs to decrease a transmission power amount.

11. The wireless access point of claim 10 further comprising:
the processing system configured to monitor the RF interference for each of the neighbor D2BS UEs and the subset of the non-neighbor D2BS UEs and determine that a new difference between the RF interference for each of the neighbor D2BS UEs and the subset of the non-neighbor D2BS UEs is above the RF interference threshold; and
the communication interface configured to wirelessly transmit an additional instruction to the D2D UEs neighboring the neighbor D2BS UEs to decrease the transmission power amount.

12. The wireless access point of claim 10 further comprising:
the processing system configured to monitor the RF interference for each of the neighbor D2BS UEs and the subset of the non-neighbor D2BS UEs and determine that a new difference between the RF interference for each of the neighbor D2BS UEs and the subset of the non-neighbor D2BS UEs is below the RF interference threshold; and
the communication interface configured to wirelessly transmit an additional instruction to the D2D UEs neighboring the neighbor D2BS UEs to increase the transmission power amount.

13. The wireless access point of claim 10 further comprising:
the processing system configured to monitor the RF interference for each of the neighbor D2BS UEs and the subset of the non-neighbor D2BS UEs and determine that a new difference between the RF interference for each of the neighbor D2BS UEs and the subset of the non-neighbor D2BS UEs is equal to or greater than the original difference between the RF interference for each of the neighbor D2BS UEs and the non-neighbor D2BS UEs; and
the communication interface configured to wirelessly transmit an additional instruction to the D2D UEs neighboring the neighbor D2BS UEs to increase the transmission power amount.

14. The wireless access point of claim 10 wherein the RF interference for each of the neighbor D2BS UEs and the non-neighbor D2BS UEs comprises a Signal-to-Noise Ratio (SNR) for each of the neighbor D2BS UEs and the non-neighbor D2BS UEs.

15. The wireless access point of claim 10 wherein the RF interference for each of the neighbor D2BS UEs and the non-neighbor D2BS UEs comprises a Reference Signal Received Power (RSRP) for each of the neighbor D2BS UEs and the non-neighbor D2BS UEs.

16. The wireless access point of claim 10 wherein the RF interference for each of the neighbor D2BS UEs and the non-neighbor D2BS UEs comprises a Reference Signal Received Quality (RSRQ) for each of the neighbor D2BS UEs and the non-neighbor D2BS UEs.

17. The wireless access point of claim 10 wherein the RF interference for each of the neighbor D2BS UEs and the non-neighbor D2BS UEs comprises a packet loss rate for each of the neighbor D2BS UEs and the non-neighbor D2BS UEs.

18. The wireless access point of claim 10 wherein the wireless access point comprises a Long Term Evolution (LTE) evolved NodeB (eNodeB).

* * * * *